United States Patent [19]

Funada et al.

[11] Patent Number: 4,892,390

[45] Date of Patent: * Jan. 9, 1990

[54] MULTI-LAYERED LIQUID CRYSTAL PANEL WITH TWISTED NEMATIC LIQUID CRYSTAL MATERIAL HAVING POLARIZERS DISPLACED FOR SHARP-RISING CHARACTERISTIC

[75] Inventors: Fumiaki Funada, Yamatokoriyama; Masataka Matsuura, Tenri; Tomio Wada, Nara, all of Japan

[73] Assignee: Sharp Kabushiki Kaisha, Osaka, Japan

[*] Notice: The portion of the term of this patent subsequent to Sep. 9, 2003 has been disclaimed.

[21] Appl. No.: 309,027

[22] Filed: Feb. 7, 1989

Related U.S. Application Data

[63] Continuation of Ser. No. 244,820, Mar. 17, 1981, abandoned.

[30] Foreign Application Priority Data

Mar. 17, 1980 [JP] Japan .................. 55-34539

[51] Int. Cl.$^4$ .............................. G02F 1/13
[52] U.S. Cl. .................... 350/335; 350/334; 350/337
[58] Field of Search ............... 350/334, 335, 337, 341, 350/346, 347 E

[56] References Cited

U.S. PATENT DOCUMENTS

| | | | |
|---|---|---|---|
| 3,941,454 | 3/1976 | Maezawa | 350/334 |
| 3,977,767 | 8/1976 | Okuma et al. | 350/335 X |
| 4,231,639 | 11/1980 | Banda | 350/335 |
| 4,231,640 | 11/1980 | Funada et al. | 350/335 X |

FOREIGN PATENT DOCUMENTS 52-49854 4/1977 Japan .

Primary Examiner—Stanley D. Miller
Assistant Examiner—Richard Gallivan
Attorney, Agent, or Firm—Birch, Stewart, Kolasch & Birch

[57] ABSTRACT

A multi-layered liquid crystal display device is disclosed, which includes a stack of liquid crystal layers in which the longitudinal axes of the liquid crystal molecules extend spirally, the liquid crystal layers being disposed in parallel with the spiral axes. A voltage supply is provided for supplying a voltage to at least a portion of the liquid crystal layers for conversion of the molecular alignment. Also provided is a pair of polarizers for making visible the conversion of the molecular alignment. More particularly, the polarization direction of the polarizers or direction normal to the polarization direction is deflected within the range of 3° to 15° with respect to the longitudinal direction of the liquid crystal molecules in a sense to reduce the spiral angle of the liquid crystal layers and the deflection angle is substantially in alignment with the longitudinal direction of the liquid crystal molecules.

8 Claims, 2 Drawing Sheets

MULTI-LAYERED LIQUID CRYSTAL PANEL WITH TWISTED NEMATIC LIQUID CRYSTAL MATERIAL HAVING POLARIZERS DISPLACED FOR SHARP-RISING CHARACTERISTIC

This application is a continuation of application Ser. No. 06/244,820 filed on Mar. 17, 1981, now abandoned.

BACKGROUND OF THE INVENTION

This invention relates to an improved structure of a multi-layered liquid crystal display panel having a stack of liquid crystal display cells each including a so-called twisted nematic liquid crystal material wherein its spiral axis is oriented within two supports in a direction normal to planes containing the two supports and the longitudinal axes of the liquid crystal molecules are twisted substantially by 90°.

As the quantity of information to be displayed continues to increase, the demand for matrix displays as the substitution of the conventional segmented displays becomes increasingly acute. Matrix displays with a high degree of multiplexing are highly desirable in the field of liquid crystal displays. It is however believed that the display properties of the liquid crystal displays are incompatible with multiplex driving as contrasted with other flat displays including a plasma display panel (PDP) and an electroluminescence display panel (ELDP). In other words, this is because the display contrast-applied voltage properties are broad and dull.

Accordingly, it is an object of the present invention to provide a new and useful multi-layered liquid crystal display panel which exhibits improved display properties It is another object of the present invention to provide a new and useful multi-layered liquid crystal display panel which bears sharp rising properties suitable for multiplex driving.

DETAILED DESCRIPTION OF THE INVENTION

Figure 1:
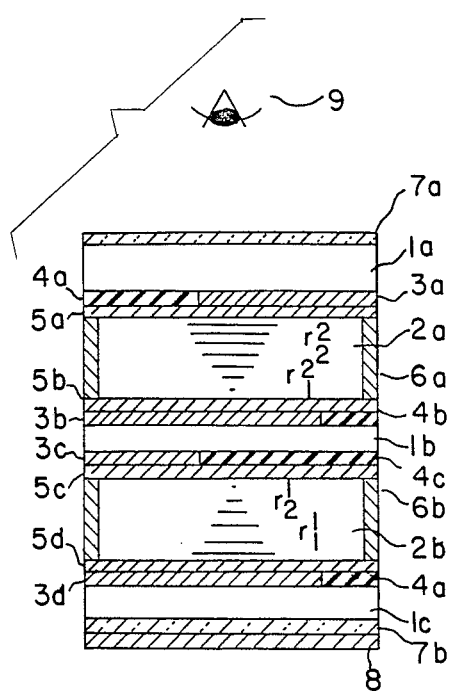
FIG. 1 is a scheme of a two-layered liquid crystal display panel having twisted nematic liquid crystal cells.

Referring to FIG. 1, there is shown a schematic construction of a two-layer twisted nematic liquid crystal display panel. Three transparent plates $1_a$, $1_b$ and $1_c$ of glass or the like are disposed as indicated and nematic liquid crystal layers (or cholesteric liquid crystal layers with a long pitch, i.e., $P_o \gtrsim 10d$) $2_a$ and $2_b$ are dispersed between the spacings a the respective transparent plates $1_a$, $1_b$ and $1_c$. In order to apply an enabling voltage to the liquid crystal layers $2_a$ and $2_b$, the transparent plates $1_a$, $1_b$ and $1_c$ are coated with transparent electrodes $3_a$, $3_b$, $3_c$ and $3_d$ of $In_2O_3$ or the like, which in turn are connected to an external driving source (not shown). Insulation layers $4_a$, $4_b$, $4_c$ and $4_d$ are deposited on those portions of the major surfaces of the transparent supports $1_a$, $1_b$ and $1_c$ where the transparent electrodes $3_a$, $3_b$, $3_c$ and $3_d$ are not disposed, for concealing reflected light on the transparent electrodes $1_a$, $1_b$ and $1_c$ from view. Alignment layers $5_a$, $5_b$, $5_c$ and $5_d$ which are subject to priority alignment technique such as rubbing or slant evaporation are set up at the interfacial surfaces between the transparent electrodes $3_a$, $3_b$, $3_c$ and $3_d$, the insulation layers $4_a$, $4_b$, $4_c$ and $4_d$ and the liquid crystal material.

The directions of the longitudinal axes of the liquid crystal molecules on these alignment layers are generally denoted $r_j^i$ and more particularly $r_1^1$, $r_1^2$ and $r_2^1$ in the order counting from the side where a light scattering reflector 8 is disposed. The transparent plates $1_a$, $1_b$ and $1_c$ are sealed to confine the liquid crystal layers $2_a$ and $2_b$ on its peripheral edges by means of proper sealants $6_a$ and $6_b$ such as epoxy resin and frit glass.

Linear polarizer filters $7_a$ and $7_b$ of iodine systems, polyene systems, dye systems or the like are disposed outside the transparent plates $1_a$ and $1_b$. It is noted that the direction of polarization by the polarizer $7_a$ is represented by vector A and the polarization by the polarizer $7_b$ is represented by vector P. The viewer is labeled 9. See FIGS. 3 and 5 for vector representation.

Figure 2:
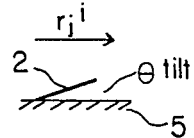
FIG. 2 is a view showing the definition of vector $r_j^i$.

FIG. 2 illustrates the definition of the above-mentioned vector $r_j^i$ wherein the liquid crystal molecule alignment layer is labeled 5 and the liquid crystal molecules are labeled 2.

Figure 3A:
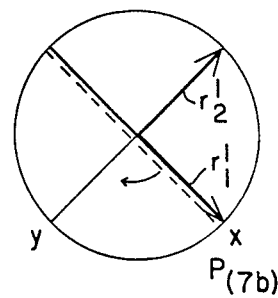
FIGS. 3(A) and 3(B) are views for illustrating the conventional way for installation of polarizers.
Figure 3B:
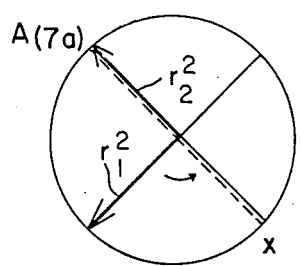

FIG. 3 shows the conventional way to install the linear polarizers $7_a$ and $7_b$. Assuming an angle defined by $r_1^1$ and P the polarization by the polarizer $7_a$ is represented by $<r_1^1 \cdot P = 0°$. Similarly, $<r_2^2 A = 0°$. It is noted that a value characteristic of $V_{sat}/V_{th}$ is identical even when $<r_1^1 \cdot P = 90°$, $<r_2^2 A = 90°$ and so on. For the sake of illustration only it is assumed that $<r_1^1 \cdot P = 0°$, $<r_2^2 \cdot A = 0°$.

The present invention provides an improved contrast property curve through a proper selection of particular directions of polarization by the polarizers $7_a$ and $7_b$. More particularly, the present invention is to provide a new and useful multi-layered liquid crystal display which offers improved display properties with an increased capacity of information display by giving sharp "rising" properties suitable for multiplex driving.

So-called optimum voltage averaging is recommended as a driving techinque for twisted nematic liquid crystal displays from a viewpoint of a circuit design. In this case the voltage margin of the effective voltage values at selected points and non-selected points are defined below:

$$\frac{V_{on}}{V_{off}} = \frac{(N-1)^{\frac{1}{2}}}{(N+1)^{\frac{1}{2}}} \quad (1)$$

where $V_{on}$ and $V_{off}$ are the effective voltage values for the selected points and non-selected points and N is the degree of multiplexing.

Figure 4:
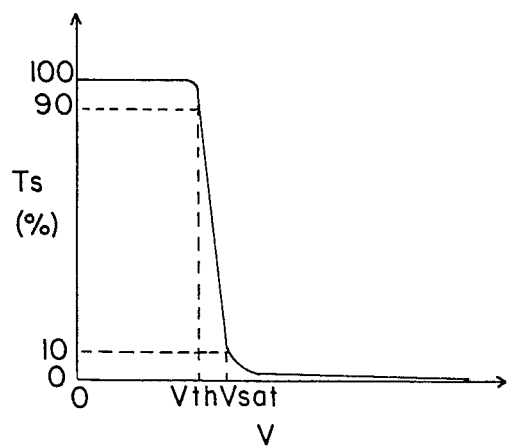
FIG. 4 is a view showing the definitions of $V_{th}$ and $V_{sat}$.

For example, $V_{on}/V_{off} = 1.39$ with $N = 10$. This implies that good display contrast is not available when the ratio of $V_{sat}$ to $V_{th}$ in the contrast property curve is greater than $V_{on}/V_{off}$. Accordingly, how to decrease the value $V_{sat}/V_{th}$ is material for the properties of the displays. FIG. 4 illustrates the definitions of $V_{th}$ and $V_{sat}$. The horizontal axis denotes the direction of the molecular alignment in the first liquid crystal or bottom layer and the vertical axis denotes the direction of molecular alignment in the second liquid crystal or top layer.

Figure 5A:
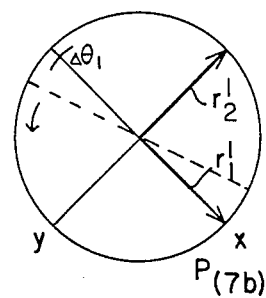
FIGS. 5(A) and 5(B) are views showing installation of polarizers in accordance with an embodiment of the present invention.
Figure 5B:
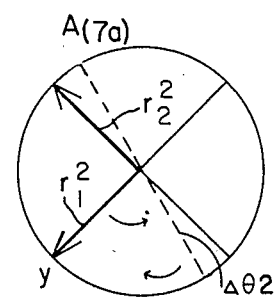

FIG. 5 is an illustration of an embodiment of the present invention. The distinctions over FIG. 3 are that the directions of P and A are out of alignment with $r_1^1$ and $r_2^2$ by $\Delta\theta_1$ and $\Delta\theta_2$ (within the range of 3° to 15°, preferably within the range of 5° to 10° in the given example), such disalignment oriented to reduce the spiral angle of a spiral liquid crystal material constituting the liquid crystal layers $2_a$ and $2_b$, and the absolute values of $\Delta\theta_1$ and $\Delta\theta_2$ are substantially identical. This is because the difference between $\Delta\theta_1$ and $\Delta\theta_2$ results in differences in electrooptical properties of the liquid crystal layers $2_a$ and $2_b$, especially $V_{sat}/V_{th}$, and non-uniformity of display quality between the two layers.

Table 1 shows the results of applicants' experiments on the foregoing aspects. Materials were used as follows: The transparent supports $1_a$, $1_b$ and $1_c$ were 2 mm thick, 0.7 mm thick and 1 mm thick soda glass sheets. The liquid crystal layer $2_a$ was nematic liquid crystal ROTN-403 by Roche including about 0.1 wt% of cholesteryl nonanoate with left-handed spiral direction. The liquid crystal layer $2_b$, on the other hand, included ROTN 403 with about 0.1 wt% of

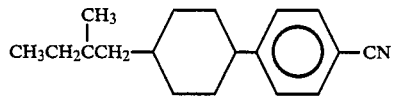

with right-handed spiral direction. The thickness of the liquid crystal layers $2_a$ and $2_b$ was about 6 um. Furthermore, $r_1^2$ is substantially in reverse parallel with $r_2^1$ and $r_1^1 \cdot r_1^2 \simeq 90°$, $<r_2^1 \cdot r_2^2 \simeq 90°$. The transparent electrodes $3_a$, $3_b$ and $3_c$ were $In_2O_3$ with a thickness of about 500 Å deposited by electron-beam evaporation. The insulation layers $4_a$, $4_b$, $4_c$ and $4_d$ were substantially of the same index of refraction as $In_2O_3$ and typically comprised $Nb_2O_3$ made by electron-beam evaporation with the same thickness as the transparent electrodes ($In_2O_3$). The alignment layers $5_a$, $5_b$, $5_c$ and $5_d$ were subject to rubbing after being overcoated with a silane surfactant (C-600 by Torei Silicone). The sealants $6_a$ and $6_b$ were made up of epoxy solder resist printing resin (R2401-HC11 by Somal). The polarizers $7_a$ and $7_b$ were linear polarizers L-83-18 by Sanritsu Electric and the scattering reflector 8 was made up of sandblasted aluminum plate.

TABLE 1

| $\Delta\theta_1$ | $\Delta\theta_2$ | Vsat/Vth |
|---|---|---|
| 0° | 0° | 1.55 |
| 0° | 10° | 1.52 |
| 10° | 0° | 1.42 |
| 10° | 10° | 1.36 |
| −10° | 0° | 1.99 |

It is noted that observation was made along the normal line with respect to the supports $1_a$, $1_b$ and $1_c$. The symbol of $\Delta\theta$ was designated minus when it reduced the twisting angle and voltage was applied to the liquid crystal layer $2_b$.

It is clear from the foregoing that the present invention greatly decreases the value $V_{sat}/V_{th}$ and optimizes the properties of the liquid crystal displays for multiplex driving.

However, in connection with the ranges of $\Delta\theta_1$, $\Delta\theta_2$, no superiority is appreciable to the conventional properties because less than 3° falls within the range of measuring error. On the other hand, more than 15° reduces the absolute contrast value and makes interfering color significant. It is therefore preferable that $\Delta\theta_1$, $\Delta\theta_2$ be within the range of 5° to 10°.

Although in the foregoing description the liquid crystal layers $2_a$ and $2_b$ are left-twisted and right-twisted, it is obvious that the present invention is equally applicable when the two layers have the same twisting direction. It has been confirmed that better properties are available even when the orientation of $r_1^2$ and $r_1^1$ are deflected within the range of 0° to 15° in a sense to be reduced with respect to the spiral direction. In this case it is also preferable that P and $r_1^1$ and A and $r_2^2$ be correlated $|\Delta\theta_1|\simeq|\Delta\theta_2|$ where $\Delta\theta_1$ and $\Delta\theta_2$ are the reducing spiral angles of the liquid crystal molecules. This is true when A is increased by 90° (or P is increased by 90°). Also, the scattering reflector 8 may be eliminated if desired from the present invention.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A multilayer liquid crystal display comprising:
   two liquid crystal cells disposed adjacent to each other so as to include a common middle substrate plate disposed therebetween and upper and bottom substrate plates disposed on either side thereof, wherein each cell contains twisted nematic liquid crystal material with molecules that are oriented
   (i) in the direction $r_2^2$ at the underside of said upper substrate plate,
   (ii) in a direction $r_2^1$ at an angle of 90° against $r_2^2$ at the topside of said middle substrate plate,
   (iii) in a direction $r_1^2$ which is opposite to $r_2^1$ at the underside of said middle substrate plate, and
   (iv) in a direction $r_1^1$ which is opposite to $r_2^2$ at the topside of said bottom substrate plate; an analyzer above the liquid crystal cells; and
   a polarizer underneath the liquid crystal cells, wherein the analyzer is twisted by an angle of $\Delta\theta_1$ against $r_2^2$, the polarizer is twisted by an angle $\Delta\theta_2$ against $r_1^1$ in the same direction as the analyzer, and $\Delta\theta_1$ and $\Delta\theta_2$ are essentially the same and are between 3° and 15°.

2. A liquid crystal display device comprising:
   a stack of liquid crystal layers each containing liquid crystal molecules having axes which progressively twist throughout the thickness of the layer, and
   a polarizer disposed above and below the stack of layers,
   wherein the axes of the molecules most closely adjacent each polarizer extend at an angle, measured in the same sense as the twist of the molecules in the direction approaching the polarizer, of from 3° to 15° to the polarization direction of the polarizer, or the normal to the polarization direction.

3. A device as claimed in claim 2, wherein the liquid crystal molecules of each layer have axes which twist through an angle of substantially 90° throughout the thickness of the layer.

4. A device as claimed in claim 3, wherein each liquid crystal layer is formed of nematic liquid crystal material.

5. A device as claimed in claim 3, wherein each liquid crystal layer is formed of cholesteric liquid crystal material.

6. A device as claimed in claim 3, including electrode means for applying a voltage across each said liquid crystal layer.

7. A device as claimed in claim 3, in which there are two liquid crystal layers.

8. A device as claimed in claim 3, wherein the axes of the molecules most closely adjacent each polarizer extend at an angle, measured in the same sense as the twist of the molecules in the direction approaching the polarizer, of from 5° to 10° to the polarization direction of the polarizer, or the normal to the polarization direction.

* * * * *